(12) United States Patent
Yoo et al.

(10) Patent No.: US 12,196,950 B2
(45) Date of Patent: Jan. 14, 2025

(54) DRIVING SIGNAL PARAMETER VARIATION FOR DRIVING MEMS MIRRORS FOR SYNCHRONIZATION CONTROL AND TUNING LISSAJOUS SCANNING

(71) Applicant: Infineon Technologies AG, Neubiberg (DE)

(72) Inventors: Han Woong Yoo, Vienna (AT); Stephan Gerhard Albert, Munich (DE); David Brunner, Dobersberg (AT); Norbert Druml, Graz (AT); Selma Karic, Graz (AT); Leonhard Niedermueller, Graz (AT); Georg Schitter, Vienna (AT); Richard Schroedter, Dresden (AT)

(73) Assignee: Infineon Technologies AG, Neubiberg (DE)

( * ) Notice: Subject to any disclaimer, the term of this patent is extended or adjusted under 35 U.S.C. 154(b) by 959 days.

(21) Appl. No.: 17/220,149

(22) Filed: Apr. 1, 2021

(65) Prior Publication Data

US 2022/0317439 A1    Oct. 6, 2022

(51) Int. Cl.
*G02B 26/08* (2006.01)
*G02B 26/10* (2006.01)

(52) U.S. Cl.
CPC ....... *G02B 26/101* (2013.01); *G02B 26/0833* (2013.01)

(58) Field of Classification Search
CPC .............. G02B 26/101; G02B 26/0833; G02B 26/0841; G02B 26/085
See application file for complete search history.

(56) References Cited

U.S. PATENT DOCUMENTS

| 7,542,191 B2 | 6/2009 | Kadowaki |
| 9,933,616 B2 * | 4/2018 | Ueda ................ G02B 26/105 |

(Continued)

FOREIGN PATENT DOCUMENTS

| CN | 101387751 A | 3/2009 |
| CN | 108025362 A | 5/2018 |

(Continued)

OTHER PUBLICATIONS

Izawa, Takashi, et al. "Scanning Micro-Mirror with an Electrostatic Spring for Compensation of Hard-Spring Nonlinearity." Micromachines, vol. 8, Aug. 4, 2017, DOI:10.3390/mi8080240.

(Continued)

*Primary Examiner* — Euncha P Cherry
(74) *Attorney, Agent, or Firm* — Harrity & Harrity, LLP

(57) ABSTRACT

A method of Lissajous scanning includes driving a first oscillator structure about a first rotation axis at a first resonance frequency according to a first driving signal, and driving a second oscillator structure about a second rotation axis at a second resonance frequency according to second driving signal different from the first resonance frequency. The first driving signal has a first low level, a first high level, and a first duty cycle, the combination of which produces the first resonance frequency, and the second driving signal has a second low level, a second high level, and a second duty cycle, the combination of which produces the second resonance frequency. At least one of the second low level, the second high level, and the second duty cycle is different from the first low level, the first high level, and the first duty cycle, respectively.

21 Claims, 11 Drawing Sheets

(56) References Cited

U.S. PATENT DOCUMENTS

| | | | |
|---|---|---|---|
| 11,014,193 B2 | 5/2021 | Dürr | |
| 11,307,403 B2 * | 4/2022 | Druml | G02B 26/101 |
| 11,520,138 B2 | 12/2022 | Boni et al. | |
| 2004/0130765 A1 | 7/2004 | Gessner et al. | |
| 2008/0278784 A1 | 11/2008 | Abe | |
| 2012/0307211 A1 | 12/2012 | Hofmann et al. | |
| 2019/0243126 A1 | 8/2019 | Liukku et al. | |

FOREIGN PATENT DOCUMENTS

| | | | |
|---|---|---|---|
| CN | 111717884 A | 9/2020 | |
| CN | 111796417 A | 10/2020 | |
| JP | 2013037324 A | 2/2013 | |

OTHER PUBLICATIONS

Sandner, Thilo, et al. "Hybrid assembled MEMS scanner array with large aperture for fast scanning LIDAR systems." tm—Technisches Messen, Feb. 3, 2019, pp. 151-163, DOI: 10.1515/teme-2019-0011.

* cited by examiner

DRIVING SIGNAL PARAMETER VARIATION FOR DRIVING MEMS MIRRORS FOR SYNCHRONIZATION CONTROL AND TUNING LISSAJOUS SCANNING

BACKGROUND

Lissajous scanning is a type of scanning implemented in display application, light scanning applications, and light steering applications, to name a few. For example, Lissajous scanning may be used in displays, Light Detection and Ranging (LIDAR), and automotive headlights in which light beams are steered by a scanning system according to a Lissajous pattern.

Lissajous scanning is typically done using two resonant scanning axes which are each driven at constant scanning frequency with a defined frequency ratio/difference therebetween that forms a specific Lissajous pattern and frame rate. For example, two resonant microelectromechanical system (MEMS) mirrors may be driven on two orthogonal scanning axes where one mirror is driven about one of the axes and the other mirror is driven about the other axis.

Resonant MEMS scanning mirrors provide high quality scanning at a high scanning frequency, receiving more attention for various applications such as automotive LIDAR and medical imaging. The stiffening structure of non-linear resonant MEMS mirrors, also called hardening or Duffing oscillator, has a positive phase as a stable solution and a wide range of high oscillation amplitudes. This allows various choices of oscillation conditions by setting the operation frequency without attenuating the oscillation amplitude too much.

In contrast, a linear resonant mirror with no or relatively small high order stiffness does not allow such a wide range in operation points. Instead, they have a very sharp resonant behavior only at a specific resonant frequency. This blocks the possibilities of the Lissajous scan with identical MEMS mirrors because identical MEMS mirrors would have the same specific resonant frequency and does not permit the needed frequency ratio/difference between scanning axes to generate a Lissajous scanning pattern. Thus, in order to perform Lissajous scanning using two linear resonant MEMS mirrors, the two mirrors must be designed differently and/or manufactured using different processes so that a certain frequency difference is realized. The need to manufacture two different mirrors under different manufacturing processes makes the overall manufacturing of a Lissajous system more complex and expensive. These difficulties also occur with a general mirror synchronization control with linear resonant MEMS mirrors such as identical scanning motions for increasing effective aperture size of the scanning system or amplitude modulated synchronization like spiral scanning Therefore, an improved system and method that is capable of performing mirror synchronization such as Lissajous scanning using same or different mirrors may be desirable to provide more flexibility and reduction in manufacturing costs.

SUMMARY

Embodiments provide a Lissajous scanning system that includes: a first oscillator structure configured to oscillate about a first rotation axis; a second oscillator structure configured to oscillate about a second rotation axis; a first driver circuit configured to generate a first driving signal to drive the first oscillator structure about the first rotation axis at a first resonance frequency, wherein the first driving signal is a waveform having a first low signal level, a first high signal level, a first duty cycle, and a first reference phase between motion of the first oscillator structure and the first driving signal, the combination of which produces the first resonance frequency; a second driver circuit configured to generate a second driving signal to drive the second oscillator structure about the second rotation axis at a second resonance frequency different from the first resonance frequency, wherein the second driving signal is a waveform having a second low signal level, a second high signal level, a second duty cycle, and a second reference phase between motion of the second oscillator structure and the second driving signal, the combination of which produces the second resonance frequency, wherein at least one of the second low signal level, the second high signal level, the second duty cycle, and the second reference phase is different from the first low signal level, the first high signal level, the first duty cycle, and the first reference phase respectively; and at least one controller configured to control the first low signal level, the first high signal level, the first duty cycle, the first reference phase, the second low signal level, the second high signal level, the second duty cycle, and the second reference phase to maintain synchronization between the first oscillator structure and the second oscillator structure including maintaining a first target frequency difference between the first resonance frequency and the second resonance frequency and a target phase difference trajectory between the two oscillator structures, e.g., linear phase reference variation over time caused by the constant first target frequency difference between the first resonance frequency and the second resonance frequency.

Embodiments further provide a method of mirror synchronization controls for Lissajous scanning, the method including: driving a first oscillator structure about a first rotation axis at a first resonance frequency according to a first driving signal, wherein the first driving signal is a waveform having a first low signal level, a first high signal level, and a first duty cycle, the combination of which produces the first resonance frequency with a first target reference phase; driving a second oscillator structure about a second rotation axis at a second resonance frequency according to second driving signal different from the first resonance frequency, wherein the second driving signal is a waveform having a second low signal level, a second high signal level, and a second duty cycle, the combination of which produces the second resonance frequency with a second target reference phase, wherein at least one of the second low signal level, the second high signal level, and the second duty cycle is different from the first low signal level, the first high signal level, and the first duty cycle, respectively; and controlling the first low signal level, the first high signal level, the first duty cycle, the second low signal level, the second high signal level, and the second duty cycle to maintain a first target frequency difference between the first resonance frequency and the second resonance frequency or to maintain a target phase difference trajectory between the first oscillator structure and the second oscillator structure.

Embodiments further provide a scanning system, including: a first oscillator structure configured to oscillate about a first rotation axis; a second oscillator structure configured to oscillate about a second rotation axis; a first driver circuit configured to generate a first driving signal to drive the first oscillator structure about the first rotation axis at a first resonance frequency, wherein the first driving signal is a waveform having a first low signal level, a first high signal level, and a first duty cycle, the combination of which produces the first resonance frequency and a first phase of the first oscillator structure; a second driver circuit configured to generate a second driving signal to drive the second oscillator structure about the second rotation axis at a second resonance frequency different from the first resonance frequency, wherein the second driving signal is a waveform having a second low signal level, a second high signal level, and a second duty cycle, the combination of which produces the second resonance frequency and a second phase of the second oscillator structure, wherein at least one of the second low signal level, the second high signal level, and the second duty cycle is different from the first low signal level, the first high signal level, and the first duty cycle, respectively; and at least one controller configured to regulate the first low signal level, the first high signal level, the first duty cycle, the second low signal level, the second high signal level, and the second duty cycle to synchronize first oscillator structure and the second oscillator structure such that a difference between the first phase and the second phase the tracks a target phase difference trajectory between the first oscillator structure and the second oscillator structure.

BRIEF DESCRIPTION OF THE DRAWINGS

Embodiments are described herein making reference to the appended drawings.

DETAILED DESCRIPTION

Figure 1A:
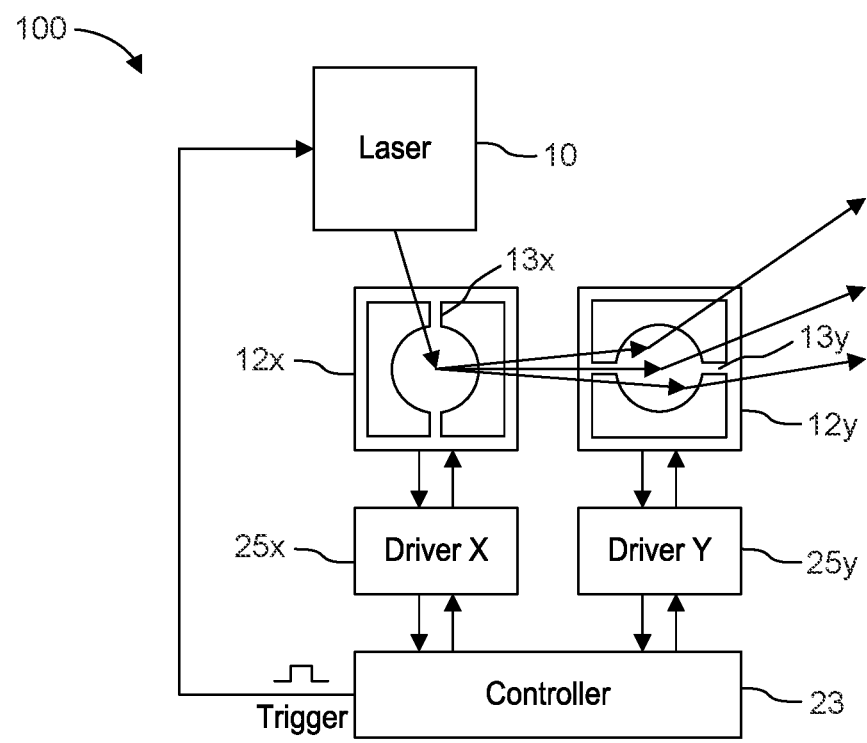
FIG. 1A is a schematic block diagram of Lissajous scanning system according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical transmitters and optical transmitter systems configured to transmit light beams or pulses according to a scanning pattern, and, more particularly, according to a synchronized scanning pattern of two or more MEMS mirrors such as Lissajous scanning, spiral scanning and enlarged aperture by synchronized multiple mirrors. For simplicity, the description from now on is focuses on Lissajous scanning since it is a well-defined scanning system with a constant frequency difference, i.e., linear phase trajectories, but can also extend to a general case by a phase modulation.

Light beams include visible light, infrared (IR) light, or other type of illumination signals. In some applications, the transmitted light may be backscattered by an object back towards the system where the backscattered light is detected by a sensor. The sensor may convert the received backscattered light into an electric signal, for example a current signal or a voltage signal, that may be further processed by the system to generate object data and/or an image.

For example, in Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light. Differences in return times for each light pulse across multiple pixels of the pixel array can then be used to make digital 3D representations of an environment or to generate other sensor data. Lissajous scanning may also be useful in other applications, such as electronic displays for rendering images thereon and automotive headlights for steering light.

A Lissajous scan (e.g., according to a Lissajous scanning pattern that employs two scanning axes) can illuminate a scene in a continuous scan fashion. By emitting successive light pulses in different scanning directions, an area referred to as the field of view can be scanned and objects within the area can be detected and imaged. Thus, the field of view represents a scanning plane having a center of projection. Lissajous scanning can be achieved when one or two mirrors are driven on two resonant scanning axes, e.g., a two-dimensional (2D) MEMS mirror, which an oscillation about each axis being driven at different resonant frequencies (i.e., scanning frequencies). The two resonant frequencies are constant with a defined frequency ratio/difference therebetween that forms a specific Lissajous pattern and frame rate.

FIG. 1A is a schematic block diagram of Lissajous scanning system 100 according to one or more embodiments. In particular, the Lissajous scanning system 100 includes two one-dimensional (1D) MEMS mirrors 12x and 12y that are used to steer or otherwise deflect light beams (pulses) according to a Lissajous scanning pattern. The MEMS mirrors 12x and 12y are mechanical moving mirrors (i.e., a MEMS micro-mirror) integrated on a semiconductor chip (not shown). They may be designed as linear or non-linear resonant MEMS mirrors. A MEMS mirror according to the embodiments described herein is configured to oscillate via rotation about a single resonant scanning axis (i.e., a 1D MEMS mirror).

For Lissajous scanning, two 1D MEMS mirrors having their scanning axes orthogonal to each other are used. An oscillation of the MEMS mirror on a scanning axis may be done so between two predetermined extremum deflection angles (e.g., +/-15 degrees) or tilt angles. A Lissajous scanner is configured to control the steering of the light beams in two dimensions (e.g., in a horizontal x-direction and in a vertical y-direction).

In the example shown in FIG. 1A, two 1D MEMS mirrors 12x and 12y are used to steer light beams in two dimensions. MEMS mirror 12x includes a first resonant scanning axis 13x that enables the MEMS mirror 12x to steer light in the x-direction, whereas MEMS mirror 12y includes a second resonant scanning axis 13y that enables the MEMS mirror 12y to steer light in the y-direction. The two MEMS mirrors 12x and 12y are arranged sequentially along a transmission path of the light beams such that one of the MEMS mirrors (e.g., MEMS mirror 12x) first receives a light beam and steers it in a first dimension and the second one of the MEMS mirrors (e.g., MEMS mirror 12y) receives the light beam from the first MEMS mirror and steers it in a second dimension. As a result, the two MEMS mirrors 12x and 12y operate together to steer a light beam generated by an illumination unit 10 in two-dimensions. In this way, the two MEMS mirrors 12x and 12y can direct a light beam at a desired 2D coordinate (e.g., an x-y coordinate) in the field of view. Multiple light beams can be steered by the two MEMS mirrors 12x and 12y at different 2D coordinates of a Lissajous pattern.

Each MEMS mirror 12x and 12y is a resonator (i.e., a resonant MEMS mirror) configured to oscillate "side-to-side" about each of its scanning axes at a resonance frequency such that the light reflected from the MEMS mirror oscillates back and forth in a scanning direction of a respective scanning axis. Different resonance frequencies having a frequency difference are used for each scanning axis 13x and 13y for defining the Lissajous pattern.

The Lissajous scanning system 100 includes an illumination unit 10 (i.e., a light transmitter) that includes at least one light source (e.g., at least one laser diode or light emitting diode) that is configured to transmit light beams (pulses) along a transmission path towards the MEMS mirror(s). The illumination unit 10 may sequentially transmit multiple light pulses according to a trigger signal received from a system controller 23.

The Lissajous scanning system 100 also include a system controller 23 that is configured to control components of the scanning system. In certain applications, such as LIDAR, the system controller 23 may also be configured to receive raw data from a light sensor (not illustrated) and perform processing thereon (e.g., via digital signal processing) for generating object data (e.g., point cloud data). Thus, the system controller 23 includes at least one processor and/or processor circuitry (e.g., comparators, time-to-digital converters (TDCs), analog-to-digital converters (ADCs), and digital signal processors (DSPs)) of a signal processing chain for processing data, as well as control circuitry, such as a microcontroller, that is configured to generate control signals used to control the illumination unit 10 and the MEMS mirrors 12x and 12y.

The system controller 23 is configured to generate a trigger signal used to trigger the illumination unit 10 to generate light pulses. Thus, the system controller 23 controls the timing light pulses are fired from the illumination unit 10 via the trigger signal. The system controller 23 is also configured to set a driving frequency for each MEMS mirror 12x, 12y (i.e., for each scanning axis) and is capable of synchronizing the oscillations about the two scanning axes 13x and 13y. The driving frequency is set according to a desired scanning (resonance) frequency so that the mirror is driven at resonance during a Lissajous scanning operation. This scanning frequency at which a MEMS mirror is driven may be referenced to as an operational frequency. The resonance frequency depends on the operating point (e.g., a target maximum deflection angle) of the MEMS mirror. The system controller 23 may set the driving frequency by setting driving signal parameters and transmitting the driving signal parameters to a corresponding MEMS driver (e.g., in one or more control signals).

The Lissajous scanning system 100 includes a MEMS driver 25x for driving MEMS mirror 12x about the first scanning axis 13x and a MEMS driver 25y for driving MEMS mirror 12y about the second scanning axis 13y. Each MEMS driver 25x, 25y actuates and senses the rotation position of the mirror about its respective scanning axis, and provides position information (e.g., tilt angle or degree of rotation about the rotation axis) of the mirror to the system controller 23. Based on this position information, the laser sources of the illumination unit 10 may be triggered by the system controller 23. Thus, a higher accuracy in position sensing of the MEMS mirror results in a more accurate and precise control of other components of the scanning system.

A drive voltage (i.e., an actuation or driving signal) is applied by a MEMS driver to an actuator structure of the MEMS mirror that corresponds to its corresponding scanning axis to drive the oscillation of the MEMS mirror about that scanning axis. The actuator structure may include interdigitated finger electrodes made of interdigitated mirror combs and frame combs to which a drive voltage (i.e., an actuation or driving signal) is applied by the MEMS driver. The frame comb fingers and the mirror comb fingers form the electrodes of a capacitor. The drive voltage applied to the actuator structure creates a driving force between, for example, interdigitated mirror combs and the frame combs, which creates a torque on the mirror body about the rotation axis. The drive voltage can be switched or toggled between two or more voltage values, including a low voltage (LV) level and a high voltage (HV), resulting in an oscillating driving force. The oscillating driving force causes the mirror to oscillate back and forth on its rotation axis between two extrema. The shift in LV level may also be referred to as the shift in direct current (DC) level considering the general arbitrary voltage input waveform since the DC level is the mean value of the absolute input waveform $|V_I|$ in case of electrostatic actuation and main parameter defining the frequency shifts by electrostatic stiffening. For simplicity, a rectangular waveform with two levels, i.e., the LV level and the HV level, is only discussed as an example.

As the mirror oscillates, the capacitance or charge between the finger electrodes changes according to the mirror's rotation position. The MEMS drivers $25x$ and $25y$ are configured to measure the capacitance or charge between the interdigitated finger electrodes via, for example, the four quadrant comb-drive displacement currents, and determine a rotation position or angle position of its MEMS mirror $12x$ or $12y$ therefrom. More specifically, the displacement currents are the time derivatives of the respective capacitances multiplied by the voltage, i.e., derivative quantities are measured instead of the capacitance or charge. By monitoring the displacement currents, the MEMS driver can detect the zero-crossing events and other non-zero angle events and timings thereof, and can determine the deflection or the tilt angle of the MEMS mirror at any given moment. The MEMS driver can also use the measured displacement currents to determine a mirror frequency, and record the information in a memory at the MEMS driver or at the system controller 23.

The sensing of the position of the MEMS mirror is performed based on a detector that is configured to measure the capacitance by the displacement current or displacement charge (i.e. integrated current). The capacitance or charge sensing can be performed indirectly by measuring derived quantities, such as the displacement currents. For example, as the MEMS mirror moves, the geometry of the finger structure changes, resulting in a change in the geometry of the capacitor. As the geometry of the capacitor changes, the capacitance of the capacitor changes. Thus, a specific capacitance corresponds directly to a specific deflection position (e.g., tilt angle) of the MEMS mirror. By sensing the capacitance of the finger structure, the MEMS driver can monitor and track the oscillations of the mirror, and determine a specific position of the MEMS mirror, including the zero-crossing.

One way to measure the capacitance is to measure a current flowing through the finger electrode structure, convert the measured current into a voltage, and then further correlate the voltage to a capacitance and/or a rotation angle θ. However, any method to measure the capacitance may be used.

As will be described in further detail below, one or more parameters of the driving signal may be selected to set the operational frequency of a MEMS mirror, including the LV level (i.e., the minimum absolute voltage value), the HV level (i.e., the peak voltage amplitude), the duty cycle, and timing, where timing corresponds to a reference phase between a mirror motion of a MEMS mirror and its driving signal.

By adjusting the HV level along with the LV level, the same level of torque can be achieved for parametric oscillation for different operational frequencies. In particular, the maximum total injected energy to the oscillator is defined by the squared voltage difference $HV^2-LV^2$. Thus, if a LV level is selected for a preselected frequency shift of the resonance, a corresponding HV level can be selected to maintain the maximum amplitude of the mirror. If the LV level is increased, then the unadjusted HV level results in a smaller $\Delta V$ (i.e., HV–LV) by maintaining the energy, the difference between the squared HV level and the squared LV level, can cause different phase condition and even mirror fall down since the injected energy is not sufficient to get the target mirror amplitude. When only the HV level is increased, then the potential maximum deflection angle is increased, which may cause mirror damage by a short time of phase mismatch between the mirror motion and the waveform of the input voltage $V_I$. Thus, if the LV level increases from a previous LV value set for a preselected torque, the HV level is also desirable to increase from a previous HV value, but the voltage difference therebetween decreases to achieve the same maximum energy injection. If the LV level decreases from a previous LV value set, the HV level also decreases from a previous HV value, but the voltage difference therebetween increases to achieve the same maximum energy injection. Of course, different levels of maximum injected energy can be achieved by adjusting the LV and HV levels even further in the course of controlling each mirror. It is also noted that a different amount of torque can be concurrently applied to both MEMS mirrors $12x$ and $12y$.

By adjusting one or more of these driving signal parameters, the operational frequency of the MEMS mirror can be adjusted. In particular, the backbone curve of the MEMS mirror is shifted up or down in frequency by adjusting the driving signal parameters. By selecting a different set of driving signal parameters for the two MEMS mirrors $12x$ and $12y$, where at least one of the parameters is different, two different operational frequencies can be achieved having a defined frequency ratio/difference therebetween for generating a Lissajous scanning pattern.

Figure 1B:
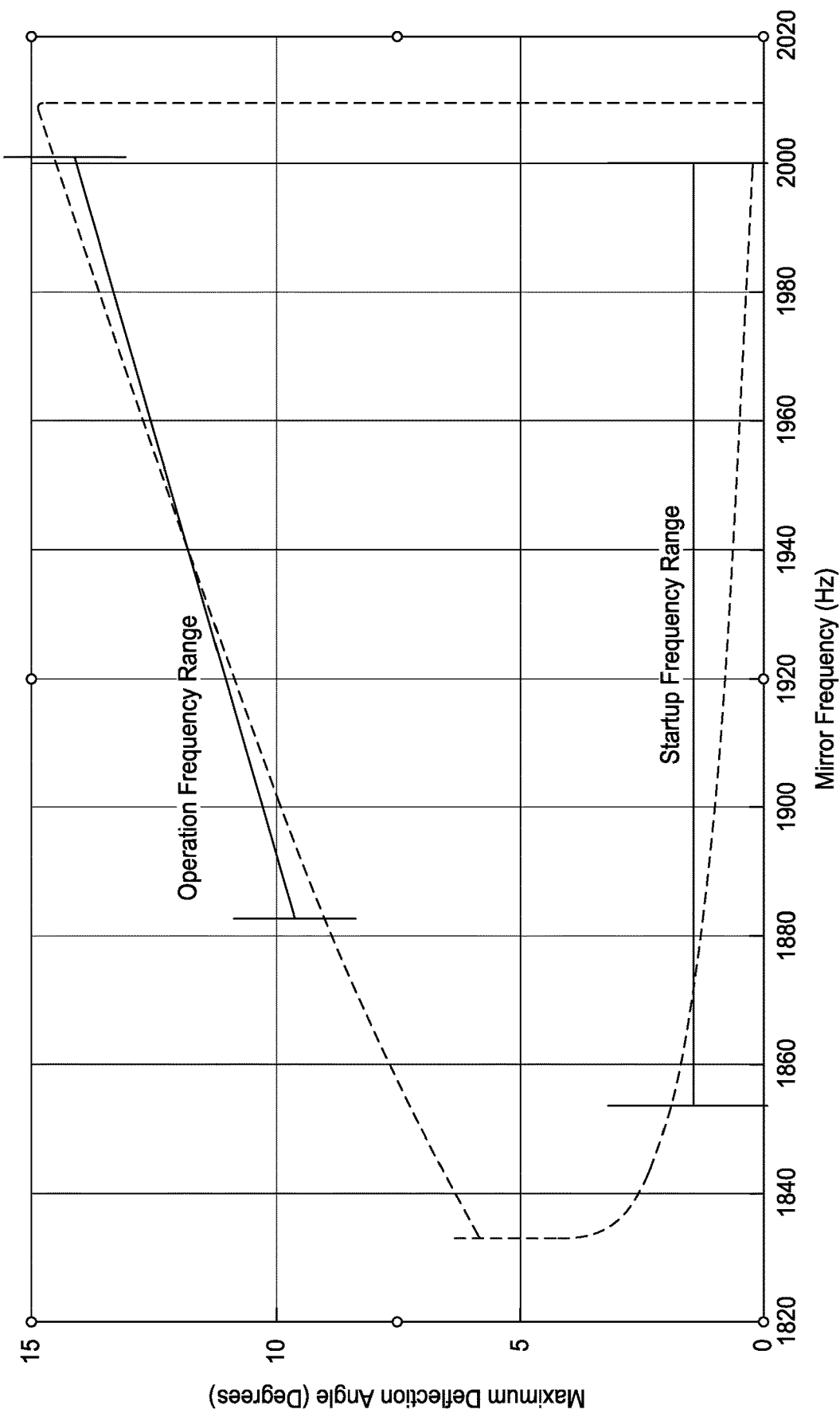
FIG. 1B shows a response curve for a nonlinear resonator according to one or more embodiments.

Once the driving signal parameters have been selected, the drive voltages may be maintained as constant drive voltages, meaning that the LV and HV levels remain their same voltages during operation of the MEMS mirror. Alternatively, the driving signal parameters may be adjusted in stages or in a sweeping operation until a MEMS mirror is shifted to its operational frequency. For example, the startup frequency of a MEMS mirror during startup may be set differently than the operational frequency (e.g., using a LV level of 0V). FIG. 1B shows a response curve for a nonlinear resonator according to one or more embodiments. The startup frequency may be selected from a startup frequency range and the operational frequency may be selected from an operation frequency range different from the startup frequency range. The startup frequency range may partially overlap with the operation frequency range where the startup frequency range has a lower minimum value and the operation frequency range has a higher maximum value. It is also possible that the startup frequency range does not overlap with the operation frequency range, where the startup frequency range is lower than the operation frequency range, or vice versa. The operational (resonance) frequency depends on the operating point (e.g., the target maximum deflection angle). Thus, it is possible that the startup frequency can be selected to be greater than or less than the operational frequency and then the driving signal parameters may be adjusted from a startup stage to an operational stage of the MEMS mirror. Similar principles can be extended to linear resonator, although with smaller respective frequency ranges.

Thus, a first set of driving signal parameters may be used to start the MEMS mirror and a second set of driving signal parameters may be used to shift the MEMS mirror up or down from the startup frequency to the operational frequency, where at least one driving signal parameter is different between the two sets of driving signal parameters resulting in different driving frequencies. For example, a variable LV level may be used where a low LV level is used during startup of a MEMS mirror, and the LV level may be increased either continuously or in one or more discrete steps to sweep the frequency of the MEMS mirror from the startup frequency to the operational frequency. In addition, low duty cycle can be used together for a mirror startup near the natural mirror frequency, i.e., operation frequency range. In this way, the mirror frequency of each MEMS mirror 12x and 12y can be varied over time by adjusting one or more of the driving signal parameters during operation (e.g., during movement of the MEMS mirror).

In other embodiments, an electromagnetic actuator may be used to drive a MEMS mirror about a corresponding scanning axis. For an electromagnetic actuator, a driving current (i.e., an actuation or driving signal) may be used to generate the oscillating driving force. The driving current may be toggled between two current levels in a similar manner described above. Thus, it will be appreciated that drive/driving voltage and drive/driving current may be used interchangeably herein to indicate an actuation signal or a driving signal, and both may generally be referred to as a driving force.

Hence, a transmission technique includes transmitting the beams of light into the field of view from one or two transmission mirrors that use two resonant scanning axes to transmit according to a Lissajous scanning pattern. The transmission mirrors continuously oscillate in resonance about each scanning axes such that the beams of light are projected into the field of view that moves across the field of view as the transmission mirror(s) changes the transmission direction. Moreover, driving signal parameters are set differently for the two MEMS mirrors 12x and 12y by the system controller 23 in order to generate the Lissajous scanning pattern according to a frequency ratio/difference established between the MEMS mirrors 12x and 12y.

Additional details for setting the driving signal parameters will now be discussed in view of shifting the operational frequency of the MEMS mirrors 12x and 12y. The system controller 23 may include a memory that stores and is capable of loading calibration data to adjust the operational frequencies of the MEMS mirrors 12x and 12y, including LV levels, HV levels, difference levels ΔV, duty cycles, and torque settings, which can be used to target specific operating points (e.g., maximum deflection angle) of each MEMS mirror. For example, different sets of these parameters may be stored for different operating points, such as different operational (resonance) frequencies each corresponding to a different maximum deflection angle.

The DC level (also LV level) adds electrostatic stiffness to a MEMS mirror and largely shifts the operational frequency of MEMS mirror over a wider range. An upward shift in the LV level increases the operational frequency and vice versa. The frequency shift become less as the peak approaches the maximum point. The phase response of the MEMS mirror does not change by the LV level change as long as the maximum injected energy is matched by the adjusted HV level.

By fixing the LV level, the HV level causes the maximum deflection angle of the MEMS mirror to change, with an increasing HV level inducing an increased maximum deflection (tilt) angle and a decreasing HV level inducing a decreased maximum deflection angle. As a result of an increased maximum deflection angle and the bend in the response curve, a small shift in operational frequency to the right is induced. Conversely, a decreased maximum deflection angle causes a small shift in operational frequency to the left. However, the maximum deflection angle peak with a high HV input voltage can break the MEMS mirror by causing stress or discharge that exceeds the limits of the MEMS mirror. Accordingly, a phase-locked loop (PLL) can be used to prevent this.

Adjusting the duty cycle also shifts the operational frequency due to the change of the injected energy while the range of change is much smaller than the range of change affected by adjusting the LV level and/or the HV level. An upward shift in the duty cycle increases the operational frequency and vice versa. However, changing the duty cycle of the driving signal causes a difference in the phase response and the operating phase response changes, which need to be compensated. Phase control via a PLL control circuit is used here for each mirror for a target frequency set point which is with a phase and an amplitude, and also an additional feature of amplitude controlled PLL also allows control of all parameters by measuring amplitude information from the current waveform extracted from the mirror. Hereafter, PLL refers to an amplitude controlled PLL, but is not limited thereto.

Due to different ranges of operational frequency adjustments, the LV level can be used as a woofer (i.e., large actuation but coarse resolution) of the operational frequency adjustment, and duty cycle and/or HV level can be used as a tweeter (i.e., small actuation but fine resolution) of the operational frequency adjustment. Thus, the operational frequencies of the two MEMS mirrors 12x and 12y can be set differently according to a frequency ratio/difference (i.e., according to a desired Lissajous scanning pattern and frame rate) by configuring the driving signal parameters. This technique of operational frequency setting between two Lissajous MEMS mirrors can be applied to identical MEMS mirrors as well as different MEMS mirrors to achieve the exact Lissajous scanning pattern that is desired.

Figure 1C:
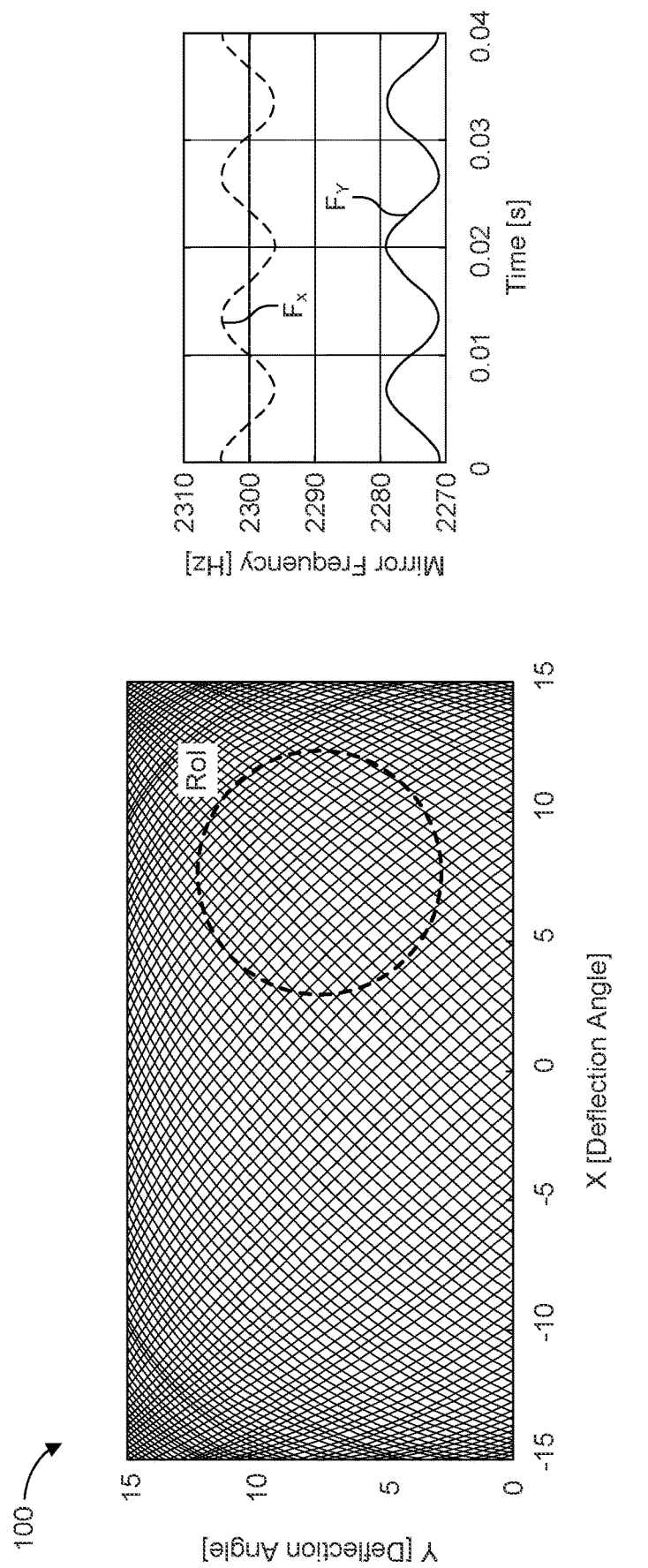
FIG. 1C shows an example of a field of view in which a Lissajous scanning pattern of a single frame is generated based on a mirror frequency variation fx and fy of the two MEMS mirrors, respectively.

In addition, the driving signal parameters can be shifted for one or both of the MEMS mirrors 12x and 12y by the system controller 23 during a Lissajous scanning period (i.e., mid-frame) to change the density of the Lissajous scanning pattern to focus on a region of interest (RoI) in the field of view. For example, by a special design of the phase modulation, an RoI can be moved over the field of view, while the frame rate is kept constant. FIG. 1C shows an example of a field of view 101 in which a Lissajous scanning pattern of a single frame is generated based on a mirror frequency variation fx and fy of the two MEMS mirrors 12x and 12y, respectively. The Lissajous scanning pattern 101 includes a higher pattern density area in an RoI. The Lissajous scanning pattern is repeated for each frame. However, the RoI may be shifted on a frame-by-frame basis based on an area of focus in the field of view. The area of focus may change based on object detection, for example.

Accordingly, regions of lower scanning (pattern) density and higher scanning (pattern) density can be created during the same scanning period or frame by adjusting one or both of the operational frequencies of the MEMS mirrors 12x, 12y according to the disclosed frequency shifting techniques. In this way, the mirror frequency of one or both mirrors can be modulated over time by adjusting one or more of the driving signal parameters during operation (e.g., during movement of the MEMS mirror).

Figure 2A:
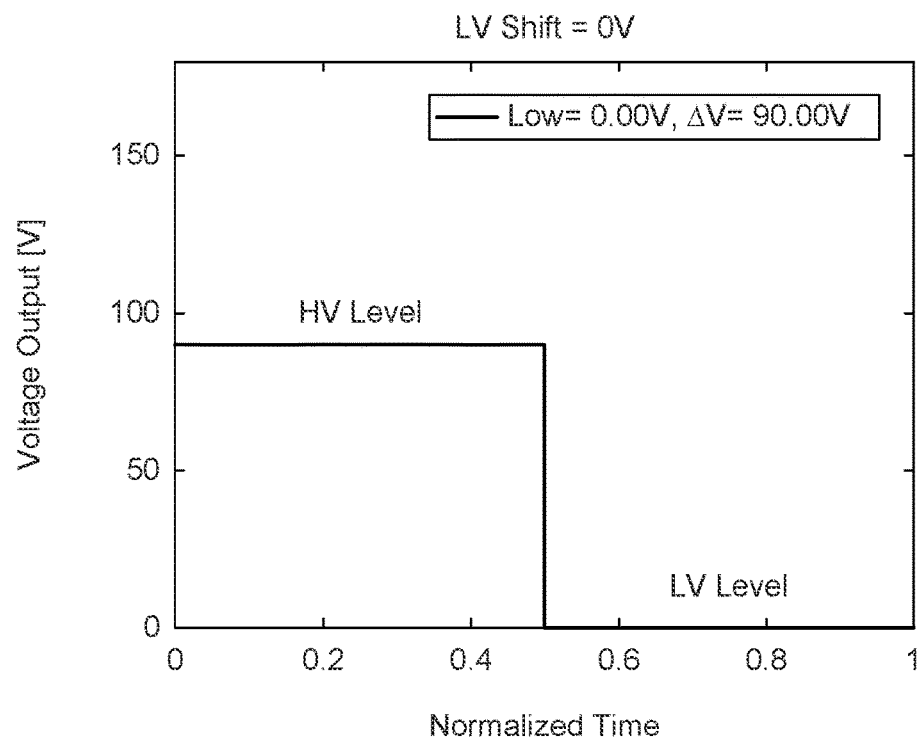
FIGS. 2A-2D are waveform diagrams of a driving signal having different LV level shifts while maintaining a same torque for parametric oscillation according to one or more embodiments.
Figure 2B:
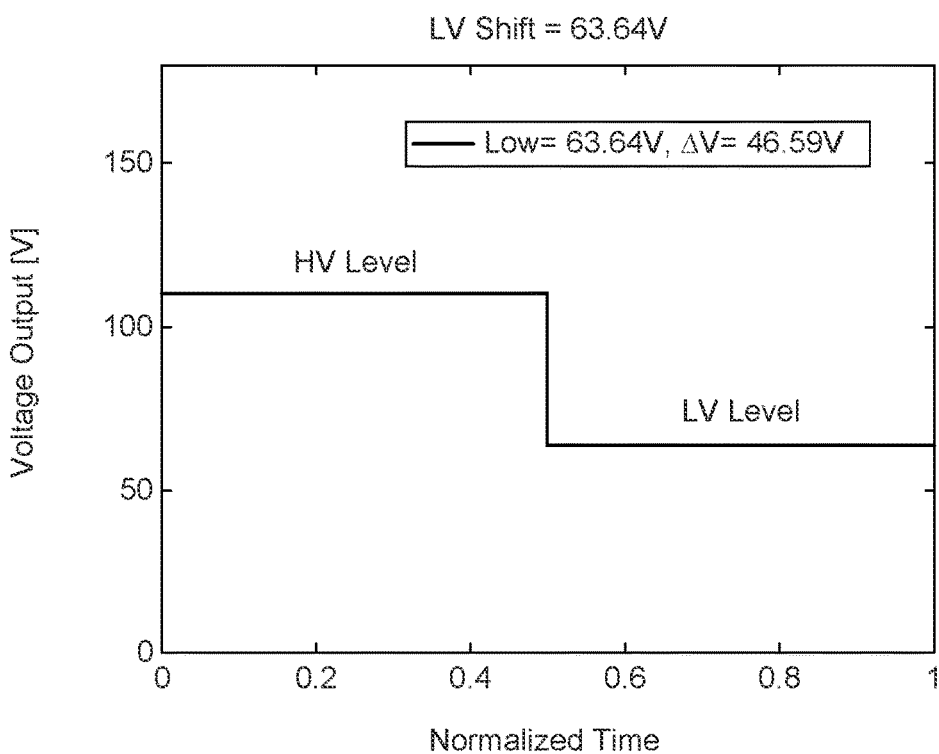
Figure 2C:
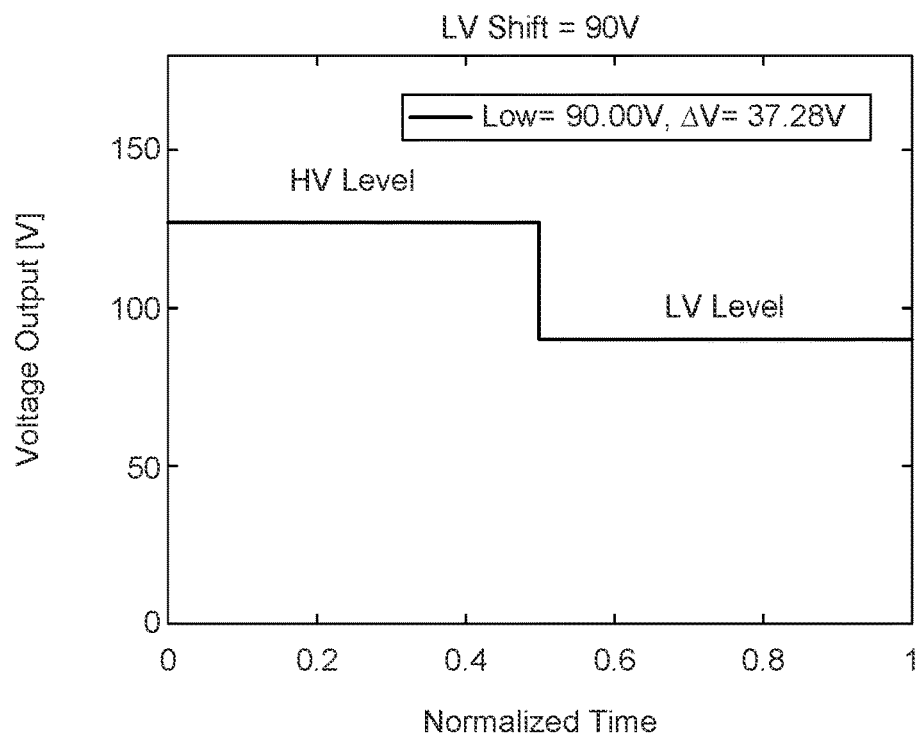
Figure 2D:
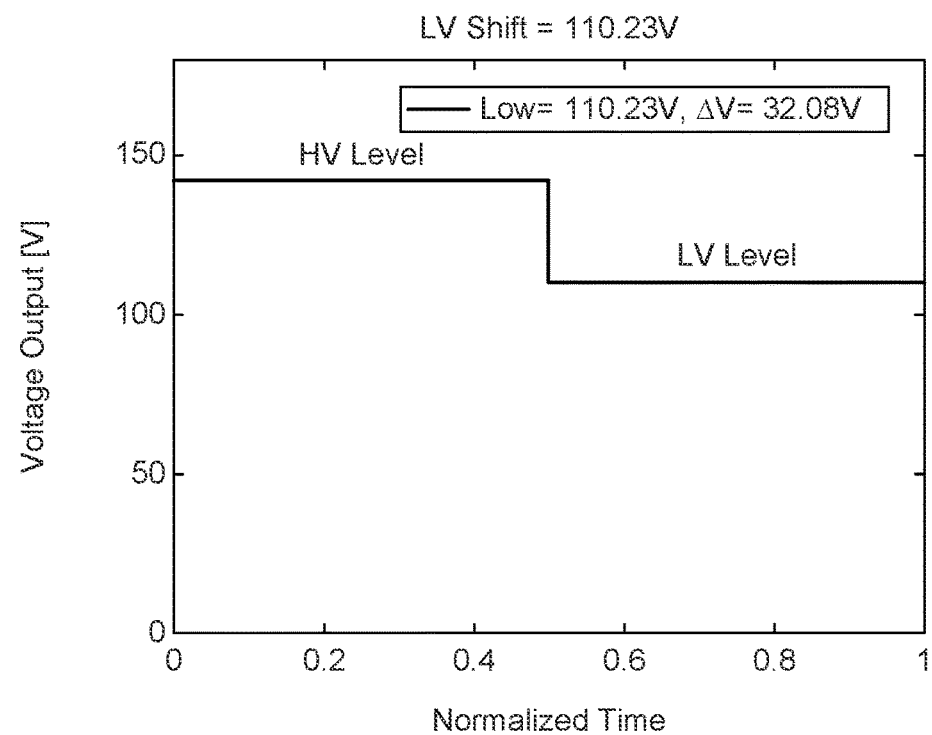

FIGS. 2A-2D are waveform diagrams of a driving signal having different LV level shifts while maintaining a same torque for parametric oscillation according to one or more embodiments. Each driving signal has a 50% duty cycle. In FIG. 2A, the LV level is set to 0V and the HV level is set to 90V (ΔV=90V). In FIG. 2B, the LV level is set to 63.64V and the HV level is set to 110.23V (ΔV=46.59V). In FIG. 2C, the LV level is set to 90V and the HV level is set to 127.28V (ΔV=37.28V). In FIG. 2D, the LV level is set to 110.23V and the HV level is set to 142.31V (ΔV=32.08V). Accordingly, the HV level and, consequently, the voltage difference ΔV, is adjusted to achieve the same maximum injected energy. In other words, the voltage difference ΔV becomes smaller as the LV level is increased in order to inject the same effective energy into the MEMS mirror.

The driving signals shown in FIGS. 2A-2D are two-level waveforms that switch between two discrete signal levels for a given period. However, it will also be appreciated that multi-level waveforms with three or more discrete signal periods for a given period may also be used. LV level can be defined in the case of arbitrary voltage input waveforms. When considering sets of driving signal parameter for multi-level waveforms, one or more discrete signal levels may be adjusted to create different sets with different corresponding driving frequencies.

Figure 2E:
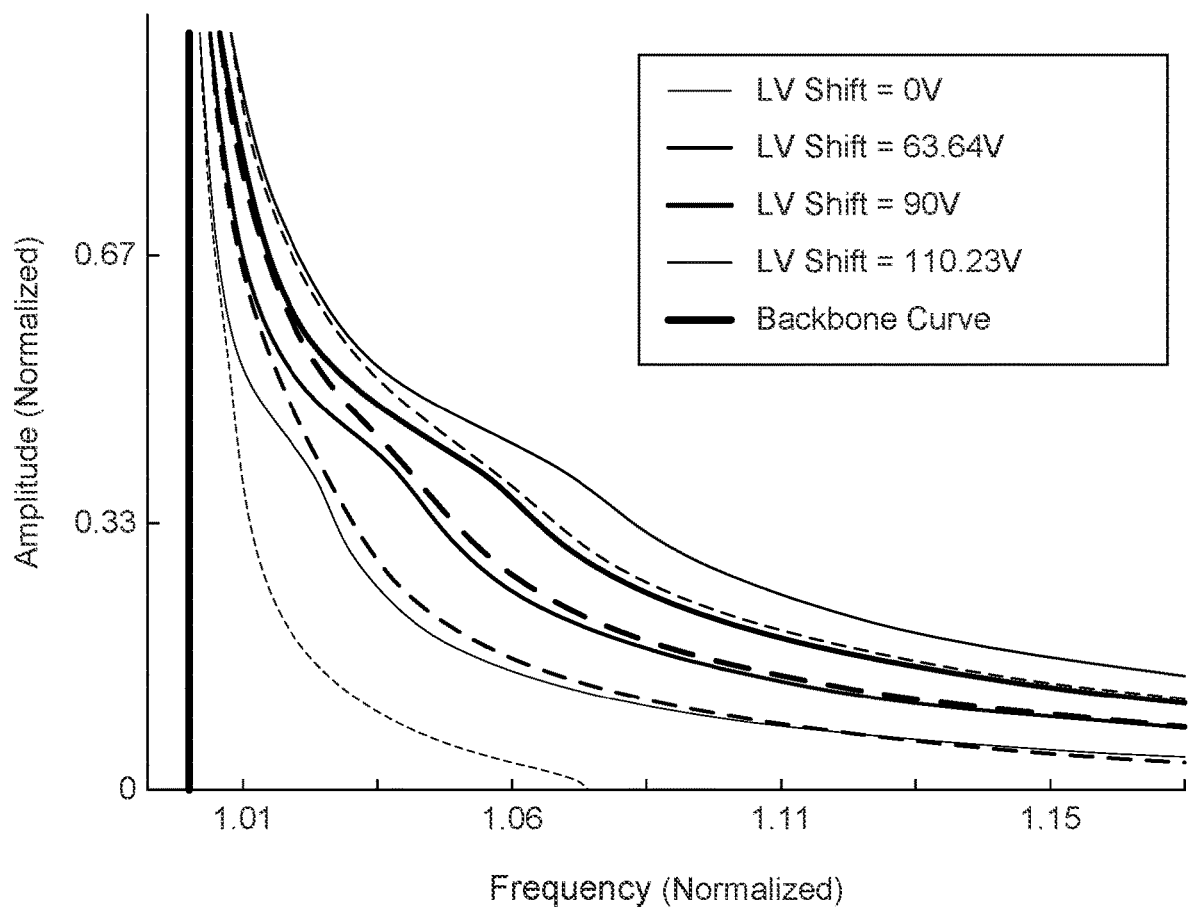
FIG. 2E shows frequency response curves for a linear resonant mirror having a driving signal applied thereto according to the driving signals shown in FIGS. 2A-2D.

FIG. 2E shows frequency response curves for a linear resonant mirror having a driving signal applied thereto according to the driving signals shown in FIGS. 2A-2D. Each response curve comprises a left response curve and a right response curve that meet at a sharp resonant peak. The amplitude in degrees refers to the deflection (i.e., tilt) amplitude of the MEMS mirror about its scanning axis. The maximum deflection amplitude generally increases with an increase in the HV level with a fixed LV level. A linear oscillator has a straight-line backbone curve as its natural frequency is amplitude-independent. Thus, the backbone curve for a linear resonant mirror is a straight vertical line. It is noted that nonlinear oscillators, in general, have the frequency that changes with their amplitude, which implies that their backbone curve is not straight, but bent. As shown here, as the LV level is increased, the operational frequency at the resonant peak of each response curve is shifted right (i.e., the operational frequency is increased). In this example, the operational frequency is shown being shifted from about a normalized frequency of 1.002 according to the parameters set in FIG. 2A to about a normalized frequency of 1.010 according to the parameters set in FIG. 2D. This corresponds to a 15 Hz shift for a 2 kHz resonant frequency.

Figure 3A:
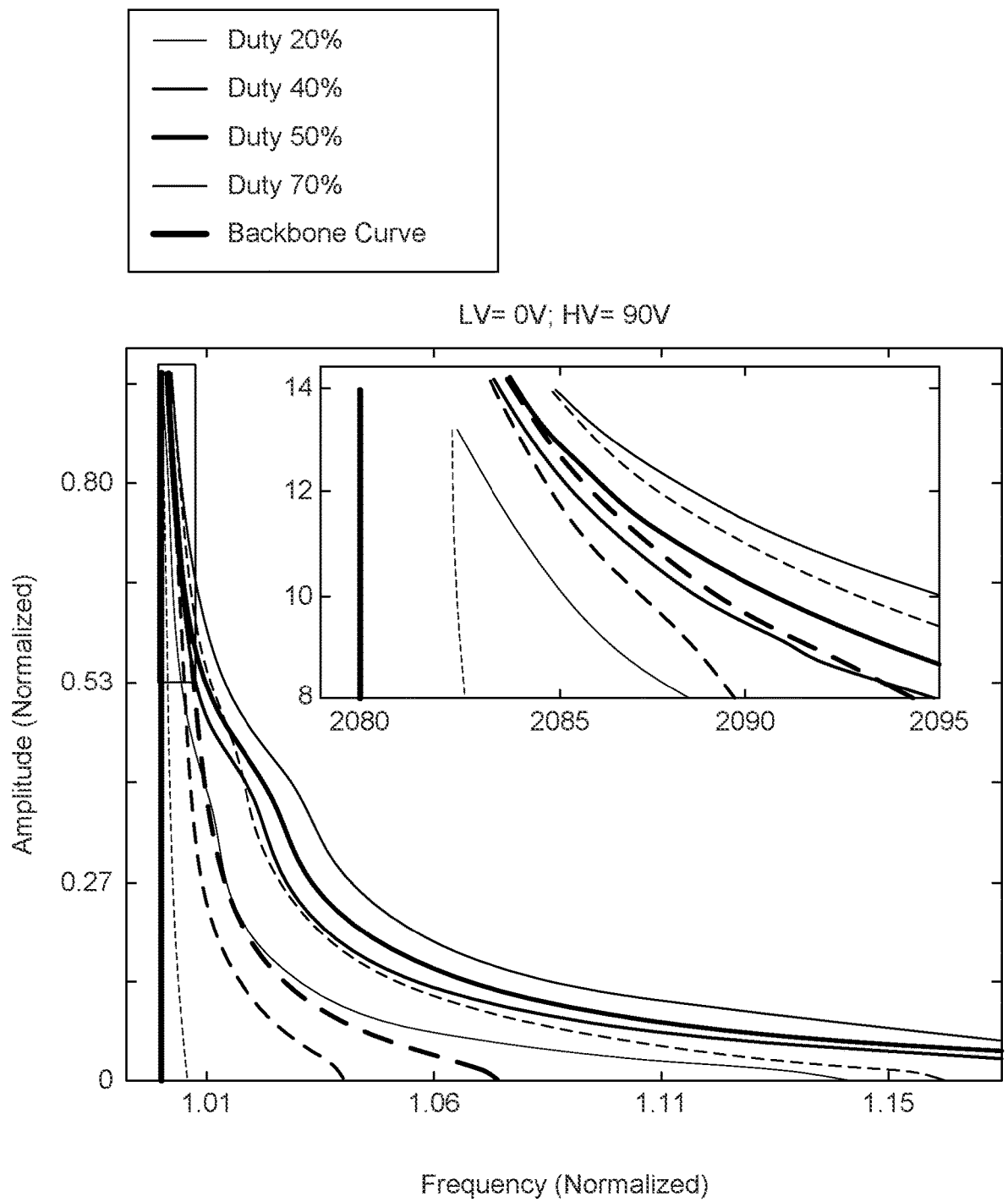
FIG. 3A shows frequency response curves for a linear resonant mirror having driving signals with different duty cycles applied thereto according to one or more embodiments.

FIG. 3A shows frequency response curves for a linear resonant mirror having driving signals with different duty cycles applied thereto according to one or more embodiments. In particular, the LV level, HV level, and voltage difference ΔV are set according to the example shown in FIG. 2A and the duty cycle is adjusted to 20%, 40%, 50%, and 70%. In this example, the operational frequency shifts from about 1.001 at a 20% duty cycle to about 1.002 at a 70% duty cycle, which corresponds to a 2 Hz shift for 2 kHz resonant frequency.

Figure 3B:
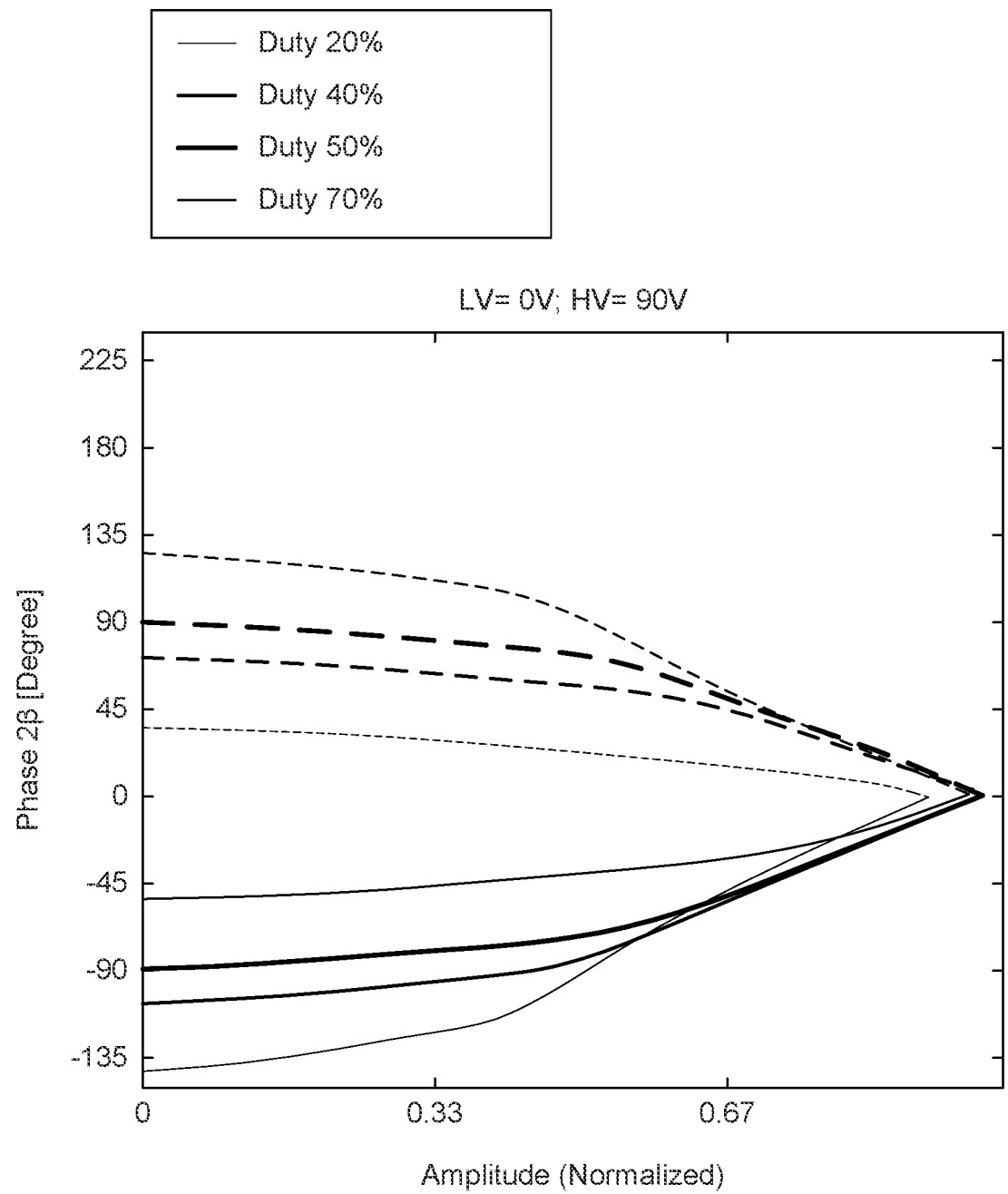
FIG. 3B shows an amplitude-phase plot of stationary points in accordance with the duty cycles shown in FIG. 3A.

FIG. 3B shows an amplitude-phase plot of stationary points in accordance with the duty cycles shown in FIG. 3A. The maximum deflection amplitude [degree] and phase condition (phase 2β [degree]) change according to a change in the duty cycle. The LV level, HV level, and voltage difference ΔV are set according to the example shown in FIG. 2A.

Due to the electrostatic stiffness, the operational frequencies are finely shifted to the high frequencies based on an adjustment to the duty cycle of the driving signal. In addition, the maximum deflection amplitude and phase condition changes due to the change in duty cycle. The maximum deflection amplitude increases with increase in duty cycle due to more energy being injected into the MEMS mirror.

This data of operational conditions—LV level, amplitude HV level, and duty cycle—can be measured during the factory calibration or during prior operations and saved for the next operation. A startup procedure during which the driving signal parameters are adjusted to shift the mirror frequency from a startup frequency to an operational frequency may also be stored as a preconfigured algorithm, which may also be adapted based on measurements taken during a prior operation of the MEMS mirror. In particular, different driving signal parameter sets can be stored for different operational points of each MEMS mirror 12x and 12y such that the driving signal parameter sets can be selected by the system controller 23 for operation of the MEMS mirror and further switched during operation (e.g., to dynamically change the Lissajous scanning pattern for regions of interest). In this way, the mirror frequency can be modulated over time. A surge change of the operational point can also be detected by the system controller 23, which can detect the surge change as an indicator of device damage or failure.

Figure 4:
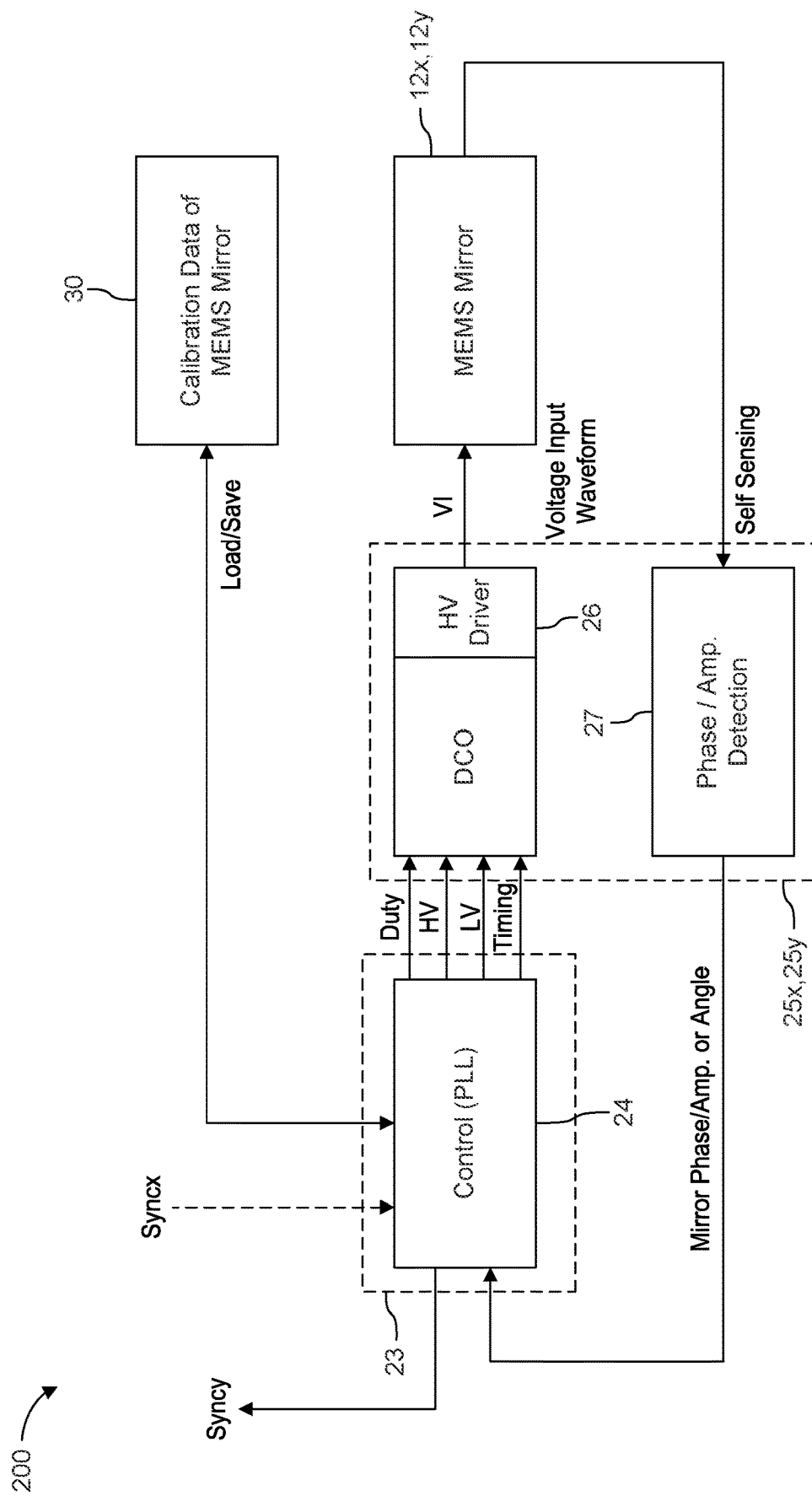
FIG. 4 is a schematic block diagram of a PLL control circuit in accordance with one or more embodiments.

FIG. 4 is a schematic block diagram of a PLL control circuit 200 in accordance with one or more embodiments. In particular, the PLL control circuit 200 is directed to a control structure for controlling one of the MEMS mirrors 12x or 12y. A similar control structure is also provided for the other MEMS mirror. Thus, two PLL control circuits 200 are provided for the Lissajous scanning system 100 with each PLL control circuit 200 including a local PLL controller 24.

The PLL control circuit 200 includes a local PLL controller 24 (i.e., a synchronization controller), a waveform generator 26 (e.g., a digitally controller oscillator (DCO) with an HV driver), a MEMS mirror 12x or 12y, and a mirror phase and deflection angle amplitude detector 27 are arranged in a control loop. The PLL controller 24 is provided within the system controller 23, whereas the waveform generator 26 and the detector 27 are provided in one of the MEMS drivers 25x or 25y.

The PLL controller 24 transmits the various driving signal parameters via one or more control signals to the waveform generator 26, the driving signal parameters including the LV level, the HV level, the duty cycle, and phase timing. The PLL controller 24 also performs mirror synchronization, phase correction, and deflection amplitude correction. The LV level is used by the PLL controller 24 to perform coarse frequency control of the MEMS mirror 12x or 12y, whereas the HV level and the duty cycle are used by the PLL controller 24 to perform fine frequency control of the MEMS mirror 12x or 12y.

The waveform generator 26 generates the driving signal $V_I$ as a voltage input waveform that drives the mirror frequency of the MEMS mirror 12x or 12y. The waveform of the driving signal $V_I$ is generated according to the selected driving signal parameters received from the PLL controller 24.

The detector 27 includes circuitry used to detect the mirror phase and the deflection angle of the MEMS mirror 12x or 12y during scanning operation. The mirror phase and deflection angle may be continuously measured and provided as feedback information to the PLL controller 24. The detector 27 may also include a processor that determines the maximum deflection amplitude and provide this information as well. The deflection angle detection may be used by the detector 27 to detect a zero-crossing of the MEMS mirror 12x or 12y, which is when the deflection angle crosses an amplitude of zero degrees. At zero degrees, a MEMS mirror is considered flat and corresponds to the resting position of the MEMS mirror when not in operation. The detector 27 may generate a signal pulse at each detected zero-crossing and transmit these zero-crossing pulses to the PLL controller 24. Additionally, the detected zero-crossings may be used to measure the mirror phase or may be representative thereof. This feedback information is used by the PLL controller 24 to perform mirror synchronization, phase correction, and deflection amplitude correction. For example, the phase difference between the two MEMS mirrors should be maintained along a target phase difference trajectory, for example, a linear phase variation induced by a constant frequency difference between the two MEMS mirrors. During the operation, the maximum deflection amplitude of the two MEMS mirrors can be maintained at a same target value.

There are three phases, including a phase Phax of the input waveform of the driving signal $V_I$ of MEMS mirror 12x, a phase Phay of the input waveform of the driving signal $V_I$ of MEMS mirror 12y, and a phase difference Phaxy (Phax−Phay) between the two MEMS mirrors 12x and 12y. The phase difference can be represented by a time difference as well (e.g., $t_{ZC,x}-t_{ZC,y}$). The timing of MEMS mirror 12x can be represented by a zero-crossing (ZC) time $t_{ZC,x}$, which indicates timings when the motion of the MEMS mirror 12x (e.g., its deflection angle) crosses zero degrees. Similarly, the timing of MEMS mirror 12y can be represented by a zero-crossing (ZC) time $t_{ZC,y}$, which indicates timings when the motion of the MEMS mirror 12y (e.g., its deflection angle) crosses zero degrees. The detector 27 can detect the zero-crossing events of its respective MEMS mirror 12x or 12y and provide the detected zero-crossing timings to the PLL controller 24.

The PLL controller 24 for MEMS mirror 12y, for example, calculates the phase Phay, receives the phase Phax in a synchronization signal Syncx from the PLL controller of MEMS mirror 12x, and calculates the phase difference Phaxy therefrom. Alternatively, the PLL controller 24 for MEMS mirror 12y, for example, receives the zero-crossing (ZC) time $t_{ZC,y}$ from the detector 27, receives the zero-crossing (ZC) time $t_{ZC,x}$ in a synchronization signal Syncx from the PLL controller of MEMS mirror 12x, and calculates the time difference therefrom. Similarly, PLL controller 24 for MEMS mirror 12y transmits a synchronization signal Syncy to the PLL controller 24 for MEMS mirror 12x, which may include phase Phay or zero-crossing (ZC) time $t_{ZC,y}$ of MEMS mirror 12y. Thus, synchronization signal Syncx and Syncy include synchronization information used by the counterpart (receiving) MEMS mirror to maintain synchronization between the two MEMS mirrors.

Each PLL controller 24 (i.e., the PLL controller for each mirror) maintains the phase to its mirror input to a target reference phase, which results in a target mirror frequency. For example, the PLL controller 24 for MEMS mirror 12y maintains a reference phase between the mirror motion of the MEMS mirror 12y and its driving signal and the PLL controller 24 for MEMS mirror 12x maintains a reference phase between the mirror motion of the MEMS mirror 12x and its driving signal. The reference phases for MEMS mirror 12y and MEMS mirror 12x are different and can be constant or variable (e.g., to account for ROI). The PLL controllers 24 maintain synchronization between the two MEMS mirrors such that a target frequency difference between the resonance frequencies thereof and a target phase difference trajectory between the two MEMS mirrors is maintained. It is noted that a linear phase reference variation is produced by a constant frequency difference between the MEMS mirrors. This linear phase reference variation (i.e., a linearly changing phase difference) may be one example of a phase difference trajectory. Each PLL controller 24 maintains a target frequency difference between the resonance frequencies of MEMS mirror 12y and MEMS mirror 12x or maintains a target phase difference trajectory Phaxy between the phases Phax and Phay of the MEMS mirrors 12x and 12y.

Figure 6:
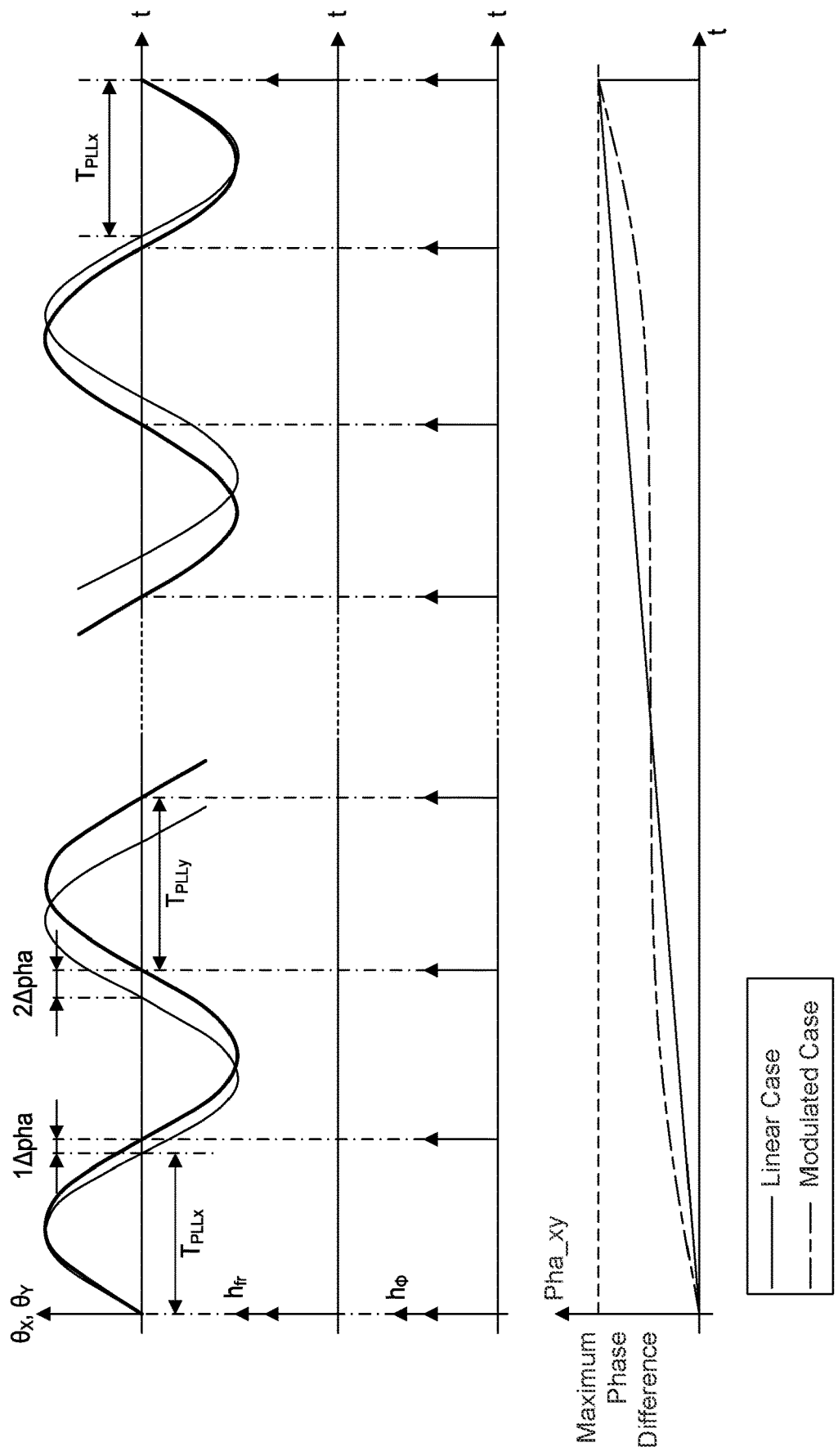
FIG. 6 shows signal waveforms for mirror defection amplitudes θx and θy, synchronization signals hfr and hφ generated by a master MEMS mirror and transmitted to a slave MEMS mirror, and a phase difference trajectory Phaxy according to one or more embodiments.

FIG. 6 shows signal waveforms for mirror deflection amplitudes θx and θy, synchronization signals hfr and hφ generated by a master MEMS mirror and transmitted to a slave MEMS mirror, and a phase difference trajectory Phaxy according to one or more embodiments. The synchronization signals hfr and hφ may be provided as a synchronization signal Syncx or Syncy generated by the master MEMS mirror, or as synchronization information provided in the synchronization signal Syncx or Syncy. Thus, a synchronization signal may include a phase Phax or Phay, a ZC time $t_{ZC,x}$ or $t_{ZC,y}$, frame synchronization hfr, and/or phase synchronization hφ in order to maintain a target frequency difference between the mirrors, to synchronize maximum deflection amplitudes of the mirrors, and to maintain a target phase difference trajectory Phaxy between the mirrors.

Here, one of the MEMS mirrors 12x or 12y is a master and the other is a slave of a master-slave configuration. The master controls the synchronization of the slave to maintain a desired target phase difference trajectory Phaxy between the two MEMS mirrors. θx corresponds to the amplitude trajectory of MEMS mirror 12x, θy corresponds to the amplitude trajectory of MEMS mirror 12y, frame synchronization signal hfr includes a frame synchronization pulse generated by the master MEMS mirror at the start of every frame of a scanning operation, and phase synchronization signal hφ includes zero-crossing synchronization pulses corresponding to the desired zero-crossings at which zero-crossings should occur at the slave MEMS mirror in order to achieve synchronized operation. Both synchronization signals of the frame hfr and phase hφ are transmitted from the master MEMS mirror to the slave MEMS mirror for synchronized operation according to the target phase difference trajectory Phaxy. Here a master-slave synchronization architecture is mainly considered but other synchronization architecture such as the centralized or the distributed manner which may change the information provided in the synchronization signals between the MEMS PLL controllers 24.

FIG. 6 illustrates an example of amplitude (oscillation) trajectories θx and θy of two synchronized MEMS mirrors 12x and 12y for Lissajous scanning, which oscillate at two different frequencies (e.g., resonance frequencies) defined by the period $T_{PLL\_x}$ of the MEMS mirror 12x and the period $T_{PLL\_y}$ of MEMS mirror 12y. Due to the frequency difference between the frequencies, a constant, linear phase shift occurs in the phase difference between the oscillation of the two MEMS mirrors over the period of a signal frame indicated by synchronization signal hft. The shifting phase difference (e.g., constantly increasing phase difference) results in the different timings of the zero-crossings for each MEMS mirror and the respective driving signals for each MEMS mirror have to be also synchronized to maintain the target phase difference trajectory. This linear increment ΔPha is a linear phase change over time that results in linear function of the target phase difference trajectory. When phase modulation is used to generate ROIs, the linear trajectory becomes adjusted, and non-linear according to the phase modulation, which results in a frequency difference change of the mirrors. A change in frequency difference results in a shift in the Lissajous scanning pattern to be more or less dense. The PLL controller 24 may provide a timing signal to the waveform generator 26 that indicates the switching times of the driving signal $V_I$ to switch from the LV level to the HV level, and vice versa. For example, the timing signal could indicate expected zero crossing times that are used by the waveform generator 26 to regulate the timings of the rising and falling edges of the driving signal $V_I$.

This PLL controller 24 is configured to track the target trajectory of the target phase difference. For example, a constant frequency difference between MEMS mirrors 12x and 12y results in linear variation of the target phase difference over a period of one frame, thereby resulting in a target phase difference trajectory. When phase modulation is applied to one or more of the MEMS mirrors 12x and 12y to generate ROIs, a modulated phase variation is added to the linear phase trajectory (see an example by dashed dot line in the phase difference trajectories), leading to a scanning frequency variation.

In particular, assuming the PLL controller 24 corresponds to MEMS mirror 12y, the PLL controller 24 is configured to receive phase information Phax or zero-crossing times $t_{ZC,x}$ from the other PLL controller (not illustrated) of the second PLL control circuit. For example, if PLL controller 24 is controlling MEMS mirror 12y, it would also receive phase information $Pha_x$ or zero-crossing times $t_{ZC,x}$ pertaining to the phase of the MEMS mirror 12x. Likewise, the PLL controller 24 transmits phase information $Pha_y$ or zero-crossing times $t_{ZC,y}$ pertaining to the phase of the MEMS mirror 12y to the other PLL controller that is in control of MEMS mirror 12x.

The PLL controller 24 is configured to receive the phase information from signal $Pha_y$ or zero-crossing times $t_{ZC,x}$ and the mirror phase information from detector 27 and synchronize the phase of MEMS mirror 12x with the phase of MEMS mirror 12y so that the phase difference is a target value at a particular time, where the phase difference changes according to the phase difference trajectory. Synchronization of the mirrors 12x and 12y may be achieved by synchronizing the maximum deflection amplitude of each mirror by modulating any of the driving signal parameters. Thus, the two mirrors MEMS 12x and 12y are configured to have the same maximum deflection amplitude and the PLL controller 24 ensures this zero difference is maintained based on the phase information obtained from both MEMS mirrors. For the fine control of the frequency, the duty cycle is used to control the injected energy of the mirror to keep the frequency difference and phase control on target, while the phase of each mirror is controlled for a target amplitude set point. Either duty cycle (tweeter, fine adjustment) or LV leveling (woofer, coarse adjustment) can be used to realize the phase modulation. This can be used for the process variation compensation, mirror synchronization including Lissajous scan, and phase modulation.

In addition, while the local PLL controller 24 handles other MEMS mirror phase information directly, a central controller could be used for synchronizing the phase of the two MEMS mirrors 12x and 12y, or a master-slave control hierarchy between local PLL controllers could be used.

The PLL controller 24 is further configured to load and save driving signal parameter sets in a memory device 30. Different driving signal parameter sets may be stored in the memory device 30 during a calibration of the MEMS mirror 12x or 12y. Additionally, the PLL controller 24 may select from the different driving signal parameter sets to achieve a desired (i.e., target) frequency difference between MEMS mirrors, to select a desired startup frequency, to select a desired operational (resonance) frequency, to select a target maximum deflection angle, or to compensate the operation of the MEMS mirror due to other factors, such as aging. Additionally, the PLL controller 24 may generate new driving signal parameter sets during operation to perform recalibration of the MEMS mirror and store the new driving signal parameter sets in the memory device 30.

Figure 5A:
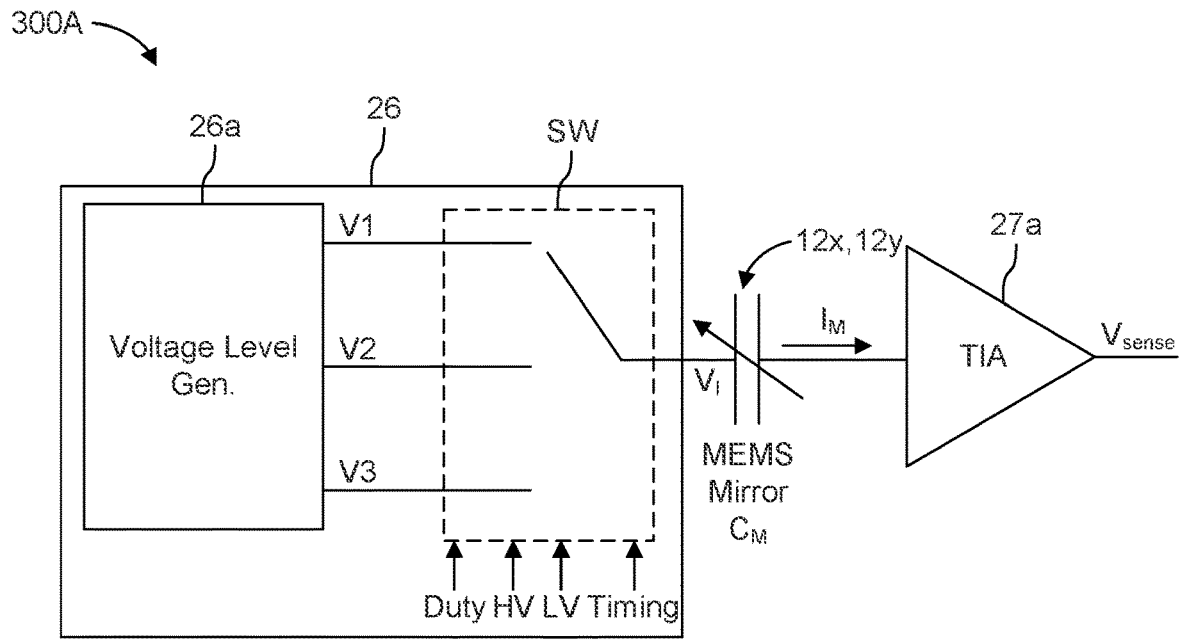
FIGS. 5A and 5B are schematic block diagrams of two types of driving circuits according to one or more embodiments.
Figure 5B:
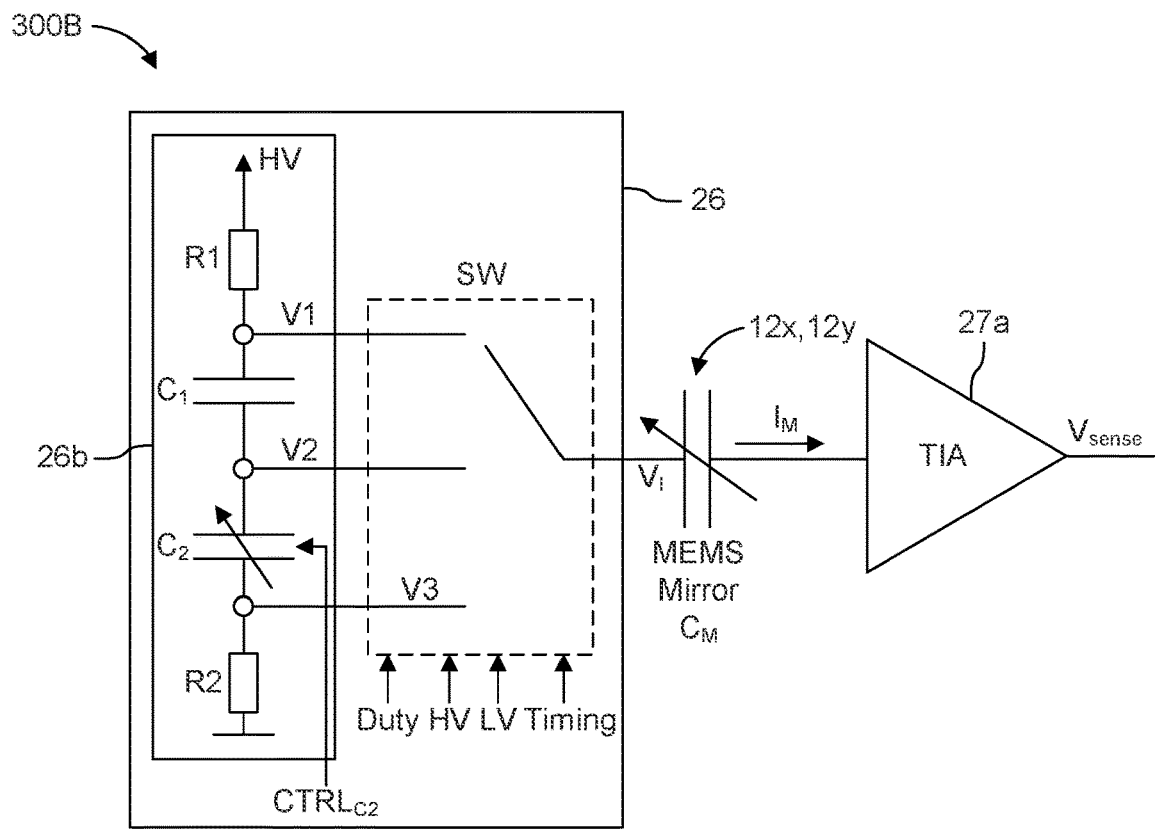

FIGS. 5A and 5B are schematic block diagrams of two types of driving circuits 300A and 300B according to one or more embodiments. In particular, driving circuits 300A and 300B both include the waveform generator 26, a MEMS mirror 12x or 12y, and a sensing circuit 27a (e.g., a transimpedance amplifier (TIA)).

In FIG. 5A, the waveform generator 26 includes a voltage level generator 26a and a controllable switch SW. The voltage level generator 26a is configured to generate three different voltage levels V1, V2, and V3 in this example, with V1>V2>V3. The voltage levels V1-V3 can also be adjusted by the voltage level generator 26a based on the desired driving signal waveform. The switch SW is selectively coupled to the voltage levels V1, V2, and V3 to generate the driving signal $V_I$ based on the driving signal parameters. For example, the switch SW may be toggled between two of the three voltage levels to generate a two-step driving signal $V_I$ according to the received duty cycle, LV level, and HV level. When using a two-stage startup sequence, the two lower voltage levels V2 and V3 may be used as the HV level and the LV level, respectively, to start the MEMS mirror at a startup frequency. After startup, the mirror frequency can be increased to the operational frequency by using V1 and V2 as the HV level and the LV level, respectively. Fine tuning of either the startup frequency or the operational frequency can be achieved by controlling the switch SW according to a selected duty cycle.

Of course, V1 and V2 may be used as the HV level and the LV level to establish the startup frequency, and voltage levels V2 and V3 may be used as the HV level and the LV level to establish the operational frequency if the startup frequency is greater than the operational frequency.

Since the actuator structure of the MEMS mirror forms a capacitor whose capacitance varies as a function of the deflection angle of the MEMS mirror, the MEMS mirror is represented as a variable capacitor $C_M$. A MEMS current $I_M$ (i.e., a displacement current) is read out and converted into a sensed voltage Vsense by a sensing circuit 27a. The sensing circuit 27a may be part of detector 27 shown in FIG. 4. The sensed voltage Vsense is used by the detector 27 to generate feedback information, such as mirror phase, deflection angle, and detected zero-crossings.

In FIG. 5B, the waveform generator 26 includes a voltage divider circuit 26b and a controllable switch SW. The voltage divider circuit 26b is configured to generate three different voltage levels V1, V2, and V3 in this example, with V1>V2>V3. The voltage levels V1, V2, and V3 are tapped from different nodes of the voltage divider chain. The switch SW is selectively coupled to the voltage levels V1, V2, and V3 to generate the driving signal $V_I$ based on the driving signal parameters. For example, the switch SW may be toggled between two of the three voltage levels to generate a two-step driving signal $V_I$ according to the received duty cycle, LV level, and HV level. When using a two-stage startup sequence, the two lower voltage levels V2 and V3 may be used as the HV level and the LV level, respectively, to start the MEMS mirror at a startup frequency. After startup, the mirror frequency can be increased to the operational frequency by using V1 and V2 as the HV level and the LV level, respectively. Fine tuning of either the startup frequency or the operational frequency can be achieved by controlling the switch SW according to a selected duty cycle.

Of course, V1 and V2 may be used as the HV level and the LV level to establish the startup frequency, and voltage levels V2 and V3 may be used as the HV level and the LV level to establish the operational frequency if the startup frequency is greater than the operational frequency.

The voltage divider circuit 26b includes two resistors R1 and R2 connected in series, with resistor R1 being connected to HV and resistor R2 being connected to ground. Two capacitors C1 and C2 are connected in series between the two resistors R1 and R2. Capacitor C2 may be a variable capacitor whose capacitance can be adjusted to shift the three voltage levels V1-V3. The capacitance of capacitor C2 can be adjusted by a control signal $CTRL_{C2}$ received from the system controller 23. As a result, the three voltage levels V1-V3 can be adjusted to achieve the desired mirror frequency and phase.

The sensing circuit 27a receives the MEMS current $I_M$ (i.e., a displacement current) and converts it into a sensed voltage Vsense to be used for generating feedback information, such as mirror phase, deflection angle, and detected zero-crossings.

Although embodiments described herein relate to MEMS devices with at least one MEMS mirror, it is to be understood that other implementations may include optical devices other than MEMS mirror devices, including other non-MEMS resonant oscillating structures that are used to steer light according to a Lissajous scanning pattern. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:
1. A Lissajous scanning system, comprising:
a first oscillator structure configured to oscillate about a first rotation axis;
a second oscillator structure configured to oscillate about a second rotation axis;
a first driver circuit configured to generate a first driving signal to drive the first oscillator structure about the first rotation axis at a first resonance frequency, wherein the first driving signal is a waveform having a first low signal level, a first high signal level, and a first duty cycle, the combination of which produces the first resonance frequency;

a second driver circuit configured to generate a second driving signal to drive the second oscillator structure about the second rotation axis at a second resonance frequency different from the first resonance frequency, wherein the second driving signal is a waveform having a second low signal level, a second high signal level, and a second duty cycle, the combination of which produces the second resonance frequency, wherein at least one of the second low signal level, the second high signal level, and the second duty cycle is different from the first low signal level, the first high signal level, and the first duty cycle, respectively; and a controller configured to control the first low signal level, the first high signal level, the first duty cycle, the second low signal level, the second high signal level, and the second duty cycle to maintain a first target frequency difference between the first resonance frequency and the second resonance frequency.

2. The Lissajous scanning system of claim 1, wherein the controller is configured to control the first driving signal and the second driving signal in order to synchronize the first and the second oscillator structures and to generate a Lissajous scanning pattern according to a predefined frame rate.

3. The Lissajous scanning system of claim 1, wherein the controller is configured to control the first low signal level and the second low signal level to be different to maintain the first target frequency difference.

4. The Lissajous scanning system of claim 1, wherein the controller is configured to control the first high signal level and the second high signal level to be different to maintain the first target frequency difference.

5. The Lissajous scanning system of claim 1, wherein the controller is configured to control the first duty cycle and the second duty cycle to be different to maintain the first target frequency difference.

6. The Lissajous scanning system of claim 1, wherein the controller is configured to modulate at least one of the first duty cycle or the second duty cycle to maintain a zero phase difference between an oscillation of the first oscillator structure and an oscillation of the second oscillator structure.

7. The Lissajous scanning system of claim 1, wherein:
the first driver circuit is configured to generate a third driving signal to drive the first oscillator structure about the first rotation axis at a first startup frequency that is different than the first resonance frequency, wherein the third driving signal is a waveform having a third low signal level, a third high signal level, and a third duty cycle, the combination of which produces the first startup frequency,
at least one of the third low signal level, the third high signal level, or the third duty cycle is different than at least one of the first low signal level, the first high signal level, or the first duty cycle, respectively, and
the controller is configured to control the first driver circuit to generate the third driving signal during a startup operation of the first oscillator structure and to shift to generating the first driving signal during a resonance operation of the first oscillator structure after completion of the startup operation.

8. The Lissajous scanning system of claim 7, wherein:
the second driver circuit configured to generate a fourth driving signal to drive the second oscillator structure about the second rotation axis at a second startup frequency that is different than the second resonance frequency, wherein the fourth driving signal is a waveform having a fourth low signal level, a fourth high signal level, and a fourth duty cycle, the combination of which produces the second startup frequency,
at least one of the fourth low signal level, the fourth high signal level, or the fourth duty cycle is different than at least one of the second low signal level, the second high signal level, or the second duty cycle, respectively, and
the controller is configured to control the second driver circuit to generate the fourth driving signal during a startup operation of the second oscillator structure and to shift to generating the second driving signal during a resonance operation of the second oscillator structure after completion of the startup operation.

9. The Lissajous scanning system of claim 1, further comprising:
a phase detection circuit configured to measure a phase of the first oscillator structure and a phase of the second oscillator structure,
wherein the controller is configured to modulate at least one of the first low signal level, the first high signal level, or the first duty cycle of the first driving signal based on the phase of the first oscillator structure and the phase of the second oscillator structure in order to maintain a zero phase difference therebetween.

10. The Lissajous scanning system of claim 1, further comprising:
a deflection angle detection circuit configured to measure a maximum deflection angle of the first oscillator structure and a maximum deflection angle of the second oscillator structure during a resonance operation of the first and the second oscillator structures,
wherein the at least one-controller is configured to modulate at least one of the first low signal level, the first high signal level, or the first duty cycle of the first driving signal based on the maximum deflection angle of the first oscillator structure and the maximum deflection angle of the second oscillator structure in order to maintain a zero maximum deflection angle difference therebetween.

11. The Lissajous scanning system of claim 10, wherein the controller is configured to modulate the at least one of the first low signal level, the first high signal level, or the first duty cycle of the first driving signal in order to maintain the zero maximum deflection angle difference therebetween, while further maintaining the first target frequency difference between the first resonance frequency and the second resonance frequency.

12. The Lissajous scanning system of claim 1, wherein:
the first driver circuit is configured to generate a third driving signal to drive the first oscillator structure about the first rotation axis at a third resonance frequency that is different from the first resonance frequency, wherein the third driving signal is a waveform having a third low signal level, a third high signal level, and a third duty cycle, the combination of which produces the third resonance frequency,
at least one of the third low signal level, the third high signal level, or the third duty cycle is different from at least one of the first low signal level, the first high signal level, and the first duty cycle, respectively,
the controller is configured to control the first driver circuit to switch from the first driving signal to the third driving signal to change a density of a Lissajous scanning pattern during a resonance operation of the first oscillator structure.

13. The Lissajous scanning system of claim 12, wherein:
the second driver circuit configured to generate a fourth driving signal to drive the second oscillator structure about the second rotation axis at a fourth resonance frequency that is different from the third resonance frequency, wherein the fourth driving signal is a waveform having a fourth low signal level, a fourth high signal level, and a fourth duty cycle, the combination of which produces the fourth resonance frequency,
at least one of the fourth low signal level, the fourth high signal level, or the fourth duty cycle is different from the second low signal level, the second high signal level, or the second duty cycle, respectively,
the third resonance frequency and the fourth resonance frequency are different such that there is a second target frequency difference therebetween, and
the controller is configured to control the second driver circuit to switch from the second driving signal to the fourth driving signal to change the density of the Lissajous scanning pattern during the resonance operation of the first oscillator structure and a resonance operation the second oscillator structure.

14. The Lissajous scanning system of claim 13, wherein the Lissajous scanning pattern is generated according to the first target frequency difference during a first time period of the resonance operation and according to the second target frequency difference during a second time period of the resonance operation.

15. The Lissajous scanning system of claim 14, wherein the first and second time periods are intervals in a same frame period of a Lissajous scan.

16. The Lissajous scanning system of claim 13, wherein the controller is configured to control the first and the second driver circuits to generate the first driving signal and the second driving signal in synchronization, and to generate the third driving signal and the fourth driving signal in synchronization.

17. The Lissajous scanning system of claim 1, wherein:
the combination of the first low signal level, the first high signal level, and the first duty cycle produces the first resonance frequency and a first phase of the first oscillator structure,
the combination of the second low signal level, the second high signal level, and the second duty cycle produces the second resonance frequency and a second phase of the first oscillator structure, and
the controller is configured to synchronize first oscillator structure and the second oscillator structure such that a difference between the first phase and the second phase tracks a target phase difference trajectory between the first oscillator structure and the second oscillator structure.

18. A method of Lissajous scanning, the method comprising:
driving a first oscillator structure about a first rotation axis at a first resonance frequency according to a first driving signal, wherein the first driving signal is a waveform having a first low signal level, a first high signal level, and a first duty cycle, the combination of which produces the first resonance frequency;
driving a second oscillator structure about a second rotation axis at a second resonance frequency according to second driving signal different from the first resonance frequency, wherein the second driving signal is a waveform having a second low signal level, a second high signal level, and a second duty cycle, the combination of which produces the second resonance frequency,
wherein at least one of the second low signal level, the second high signal level, and the second duty cycle is different from the first low signal level, the first high signal level, and the first duty cycle, respectively; and
controlling the first low signal level, the first high signal level, the first duty cycle, the second low signal level, the second high signal level, and the second duty cycle to maintain a first target frequency difference between the first resonance frequency and the second resonance frequency.

19. The method of claim 18, wherein controlling the first low signal level, the first high signal level, the first duty cycle, the second low signal level, the second high signal level, and the second duty cycle comprises:
controlling the first low signal level and the second low signal level to be different to maintain the first target frequency difference.

20. The method of claim 18, wherein controlling the first low signal level, the first high signal level, the first duty cycle, the second low signal level, the second high signal level, and the second duty cycle comprises:
controlling the first high signal level and the second high signal level to be different to maintain the first target frequency difference.

21. The method of claim 18, wherein controlling the first low signal level, the first high signal level, the first duty cycle, the second low signal level, the second high signal level, and the second duty cycle comprises:
controlling the first duty cycle and the second duty cycle to be different to maintain the first target frequency difference.

* * * * *

UNITED STATES PATENT AND TRADEMARK OFFICE
CERTIFICATE OF CORRECTION

PATENT NO. : 12,196,950 B2
APPLICATION NO. : 17/220149
DATED : January 14, 2025
INVENTOR(S) : Han Woong Yoo et al.

Page 1 of 1

It is certified that error appears in the above-identified patent and that said Letters Patent is hereby corrected as shown below:

In the Claims

Claim 10:
Column 20 Line 34, change "wherein the at least one-controller is configured to" to -- wherein the controller is configured to --

Signed and Sealed this
Fourth Day of March, 2025

Coke Morgan Stewart
*Acting Director of the United States Patent and Trademark Office*